US009536499B2

(12) United States Patent
Fox et al.

(10) Patent No.: US 9,536,499 B2
(45) Date of Patent: *Jan. 3, 2017

(54) COMPOSITING SCREEN

(71) Applicant: DreamLight Holdings Inc., Beverly Hills, CA (US)

(72) Inventors: Steve Fox, Los Angeles, CA (US); Albert Vass, Los Angeles, CA (US)

(73) Assignee: DREAMLIGHT HOLDINGS INC., Beverly Hills, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/591,136

(22) Filed: Jan. 7, 2015

(65) Prior Publication Data

US 2015/0123877 A1    May 7, 2015

Related U.S. Application Data

(63) Continuation of application No. 14/183,162, filed on Feb. 18, 2014, now Pat. No. 8,944,609.

(60) Provisional application No. 61/766,584, filed on Feb. 19, 2013.

(51) Int. Cl.
| | |
|---|---|
| *G03B 21/62* | (2014.01) |
| *G09G 5/14* | (2006.01) |
| *G09G 5/377* | (2006.01) |
| *G09G 3/00* | (2006.01) |
| *G09G 3/34* | (2006.01) |

(52) U.S. Cl.
CPC .............. *G09G 5/14* (2013.01); *G03B 21/62* (2013.01); *G09G 3/002* (2013.01); *G09G 3/3406* (2013.01); *G09G 5/377* (2013.01); *G09G 2300/023* (2013.01); *G09G 2340/10* (2013.01); *G09G 2340/125* (2013.01)

(58) Field of Classification Search
CPC ......... G03B 21/10; G03B 21/56; G03B 21/60; G03B 21/604; G03B 21/625; G02B 26/0841; G06F 19/18; G06F 3/0421; G06F 3/1423; G06F 3/1446; G09G 3/346; G09F 19/18; H04N 13/0495; H04N 13/0497
See application file for complete search history.

(56) References Cited

U.S. PATENT DOCUMENTS

| | | |
|---|---|---|
| 1,868,068 A | 7/1932 | Moulten |
| 4,136,935 A | 1/1979 | Cook et al. |
| 5,140,460 A | 8/1992 | Fukuhara et al. |
| 5,326,266 A | 7/1994 | Fisher et al. |
| 5,329,323 A | 7/1994 | Biles |
| 5,376,980 A | 12/1994 | Gersuk et al. |

(Continued)

FOREIGN PATENT DOCUMENTS

| | | |
|---|---|---|
| EP | 1 916 845 | 4/2008 |
| EP | 2 061 261 | 5/2009 |

OTHER PUBLICATIONS

International Preliminary Report on Patentability for PCT/US2014/016936, mailed Aug. 25, 2015.

(Continued)

*Primary Examiner* — Sultan Chowdhury
(74) *Attorney, Agent, or Firm* — Foley & Lardner LLP

(57) ABSTRACT

A compositing screen includes a partially or fully transparent front screen that displays one image or video and a back screen displaying another image or video. The two images can be seen simultaneously, providing a composite image.

18 Claims, 8 Drawing Sheets

(56) References Cited

U.S. PATENT DOCUMENTS

| | | |
|---|---|---|
| 5,577,350 A | 11/1996 | Brisbin et al. |
| 5,765,314 A | 6/1998 | Giglio et al. |
| 5,833,544 A | 11/1998 | Corbin et al. |
| 5,964,064 A | 10/1999 | Goddard et al. |
| 6,017,276 A | 1/2000 | Elson et al. |
| 6,151,081 A | 11/2000 | Gold et al. |
| 6,237,290 B1 | 5/2001 | Tokimoto et al. |
| 6,253,494 B1 | 7/2001 | Shaffron |
| 6,271,814 B1 | 8/2001 | Kaoh |
| 6,407,798 B2 | 6/2002 | Graves et al. |
| 6,409,599 B1 | 6/2002 | Sprout et al. |
| 6,578,971 B1 | 6/2003 | Neff |
| 6,593,957 B1 | 7/2003 | Christie |
| 6,665,985 B1 | 12/2003 | Hennes |
| 6,727,971 B2 | 4/2004 | Lucas |
| 6,733,136 B2 | 5/2004 | Lantz et al. |
| 6,848,219 B2 | 2/2005 | Standard et al. |
| 6,909,543 B2 | 6/2005 | Lantz |
| 6,937,295 B2 | 8/2005 | Islam et al. |
| 7,180,663 B2 | 2/2007 | Collender et al. |
| 7,522,339 B2 * | 4/2009 | Kuo .................. G03B 21/10 |
| | | 359/459 |
| 7,545,108 B2 | 6/2009 | Flessas |
| 7,791,799 B1 | 9/2010 | Lejeune et al. |
| 8,012,023 B2 | 9/2011 | Gates et al. |
| 8,054,547 B2 | 11/2011 | Anderson et al. |
| 8,194,315 B2 | 6/2012 | Sharp et al. |
| 8,206,230 B2 | 6/2012 | Magpuri |
| 2001/0040671 A1 | 11/2001 | Metcalf |
| 2004/0080822 A1 * | 4/2004 | Shafer ................. G09F 19/18 |
| | | 359/459 |
| 2004/0183656 A1 | 9/2004 | Abel et al. |
| 2004/0257435 A1 * | 12/2004 | Clinton .................. G09F 19/12 |
| | | 348/36 |
| 2005/0110964 A1 | 5/2005 | Bell et al. |
| 2005/0190442 A1 * | 9/2005 | Lippey .................. G03B 21/56 |
| | | 359/449 |
| 2007/0176848 A1 | 8/2007 | Ferren et al. |
| 2008/0186415 A1 | 8/2008 | Boud et al. |
| 2008/0211972 A1 | 9/2008 | Congard et al. |
| 2008/0266524 A1 | 10/2008 | Relke et al. |
| 2009/0297797 A1 | 12/2009 | Coleman et al. |
| 2010/0002193 A1 | 1/2010 | Hines |
| 2010/0073468 A1 | 3/2010 | Kutner |
| 2010/0123880 A1 | 5/2010 | Oren |
| 2010/0300006 A1 | 12/2010 | Magpuri |
| 2011/0058113 A1 | 3/2011 | Threlkel et al. |
| 2011/0170074 A1 | 7/2011 | Ferren et al. |
| 2012/0218191 A1 | 8/2012 | Huang et al. |
| 2012/0224311 A1 | 9/2012 | Sutherland et al. |
| 2012/0247030 A1 | 10/2012 | Magpuri |

OTHER PUBLICATIONS

International Search Report and Written Opinion for PCT/US14/16936 mailed Aug. 7, 2014.

Non-Final Office Action on U.S. Appl. No. 14/183,162, mailed May 23, 2014.

Notice of Allowance on U.S. Appl. No. 14/183,162, mailed Nov. 6, 2014.

Stewart, "Screen Materials Overview" 2012, retrieved Jun. 12, 2014, 22 pages.

* cited by examiner

COMPOSITING SCREEN

CROSS-REFERENCE TO RELATED APPLICATIONS

This application is a continuation of U.S. application Ser. No. 14/183,162, filed Feb. 18, 2014, which claims the benefit of priority to U.S. Provisional Application No. 61/766,584, filed Feb. 19, 2013, the entire contents of which are incorporated by reference herein and for all purposes.

SUMMARY

Described herein is a "compositing screen" for an entertainment venue that provides for enhanced displays in an immersive environment. In one embodiment described in detail herein, the compositing screen is an Immersive Display Screen (or "IDS") theater screen. Enclosed within the IDS, the venue includes a centrally located, outfacing audience area with standing room, general admission seats, and VIP seats. A performance stage may encircle the outside of the audience area, and/or the perimeter of the immersive environment, enclosed within the IDS, located between the screen and the audience.

In an example embodiment, the compositing screen includes a front screen for displaying a front image possibly via a projector (or series of projectors) for creating a front image onto the front screen. The compositing screen also includes a back screen displaying a back image, as seen though the front screen, which would effectively be transparent (or semi-transparent). The front screen may be formed of perforated aluminum or front projection film affixed to glass or ETFE.

In another embodiment, a compositing screen is an immersive display screen, which includes a front screen and a back screen (with the back screen behind the front screen). Each screen, or one of the screens, uses light emitting diodes (LEDs), front projection, or another video producing technology (e.g., lasers, rear projection, and/or a yet to be defined light source) to display at least two separate images towards the same audience area. The back screen is toroidal or ellipsoidal in shape, and may be equidistant from the front screen throughout. The front screen that is positioned on the inside of the back screen is transparent, seemingly transparent (e.g. glass or plastic), or partially transparent (i.e., perforated material) to the light from the back screen. In this way, the compositing screen provide a "composite" image effect for the audience (i.e., the audience sees both layers of imagery simultaneously).

The foregoing is a summary and thus by necessity contains simplifications, generalizations and omissions of detail. Consequently, those skilled in the art will appreciate that the summary is illustrative only and is not intended to be limiting. Other aspects, inventive features, and advantages of the various elements, devices, and/or processes described herein will become apparent in the detailed description set forth herein and taken in conjunction with the accompanying drawings.

DETAILED DESCRIPTION

Referring generally to the figures, a compositing screen is described along with accompanying systems and venue. Although the compositing screen may be used in the example venue, other venues, theater areas, and screen geometries may be alternatively used. In one embodiment, the compositing screen may be an immersive display screen (IDS).

The following description is divided into three sections: (1) Venue Architecture and Systems, (2) Compositing Screen Design, and (3) Uses. The venue architecture and systems section describes the environment in which a compositing screen may be used, including some of the systems, techniques, structures, and devices that are used to facilitate the functions of an entertainment venue that uses the compositing screen. The screen design section describes the physical design and layout of an example screen. The uses section describes a few of the novel ways that an exemplary compositing screen may be used. Additional information and disclosure regarding the venue, audio, and stage technology that may be used in combination with the embodiments disclosed herein may be found in copending U.S. application Ser. No. 14/183,231 (entitled "Entertainment Venue And Associated Systems/Methods"), U.S. application Ser. No. 14/183,208 (entitled "Immersive Sound System"), and U.S. application Ser. No. 14/183,077 (entitled "Rotating Performance Stage"), which are incorporated herein by reference.

Venue Architecture and Systems

Figure 1:
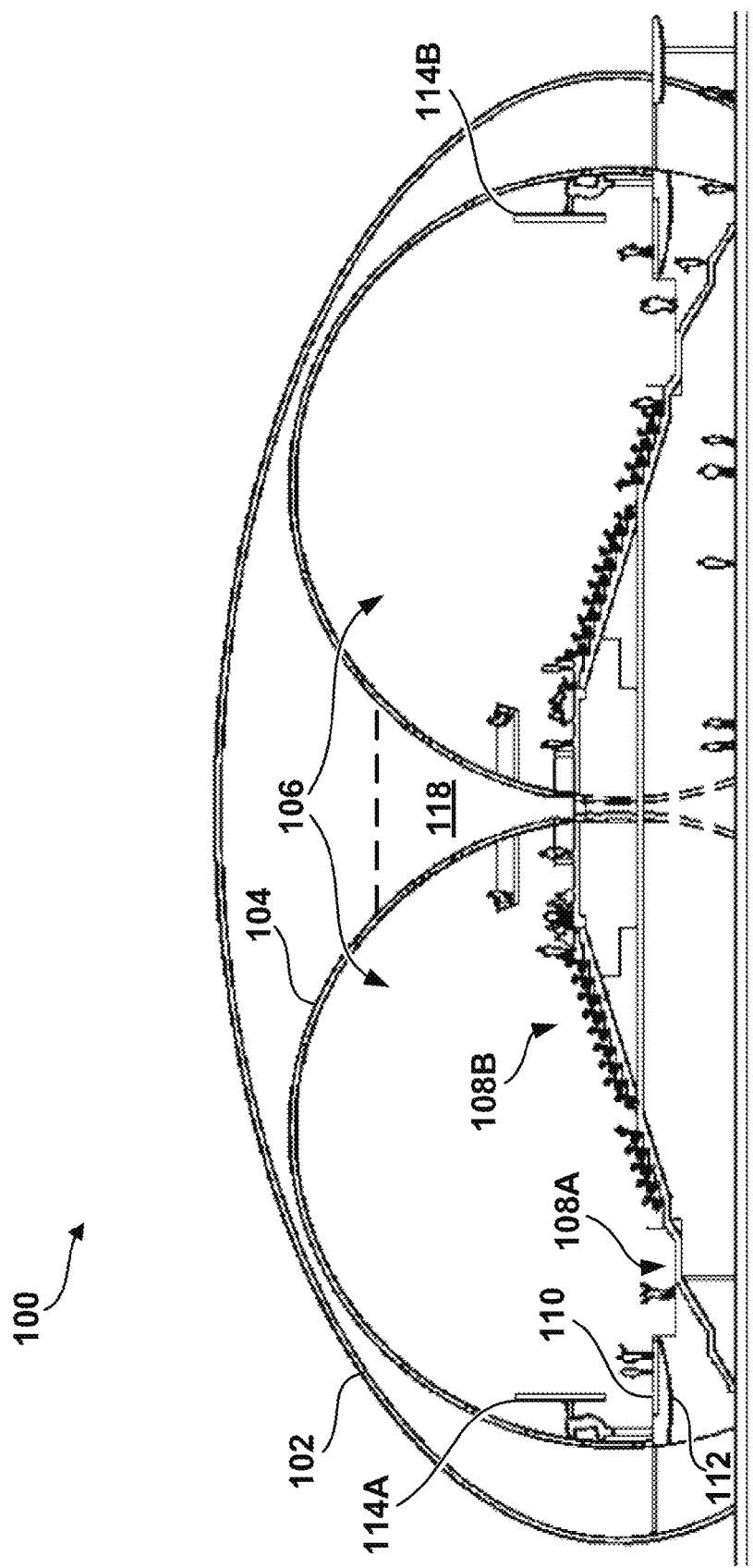
FIG. 1 is a layout design of an exemplary venue with a one-screen 360° theater IDS embodiment.

FIG. 1 shows one embodiment of an entertainment venue 100. As shown, venue 100 includes a dome-shaped exterior 102 over a torus-shaped interior structure 104 that encloses a theater area 106. Theater area 106 includes various levels of audience standing 108A and seating 108B, a stage 110 with supporting structure 112, and multiple secondary screens 114A and 114B (e.g., robotic or other fixed or movable exhibition systems such as Pepper's Ghost, holograms, projection on projection film backed ETFE, etc.). In addition to theater area 106, FIG. 1 shows other areas of venue 100, including, torus-center area 118. Torus-center area 118, and/or the other open portions below enclosure 102, may house various mechanical, audio/visual, utility, and other elements that support the functions of venue 100. For example, projectors, speakers, cabling, switching systems, plumbing, HVAC, safety equipment, ladders, catwalks, cameras, house lighting, Emergency Exit signs, rigging, and/or control stations, among other possibilities, may also be held in torus-center area 118. Since the interior structure 104 and enclosed theater area 106 are toroidal in shape, FIG. 1 shows theater area 106 (along with corresponding portions of standing 108A, seating 108B, stage 110, and supports 112) in two segments. In an example embodiment, the arrangement of torus-shaped interior structure 104, theater area 106, standing 108A, seating 108B, and stage 110 may continue around the circumference of the toroidal shape, with secondary screens placed at intervals around the stage (e.g., up to 24 different secondary screens). As will be described in the following sections, various alternative embodiments may include fewer, additional, or different elements than the arrangement shown in FIG. 1.

I. Exterior Enclosure

One embodiment of an external enclosure is a "dome" shaped shell enclosing the indoor toroidal enclosure and various theater features of the entertainment venue. FIG. 1 shows such an implementation, in which the exterior shell is in the shape of an ellipsoid. Other example embodiments could include spherical, hemispherical, rectangular, cubic, pyramid shaped, toroidal, conical, or other shape of exterior enclosures. In some cases, the implementation of the shell exterior may be supported separately from the display screen to handle various loads, such as wind loads that will not be a requirement for the internal enclosure. In other implementations, the display screen and exterior may be supported by connected rigging to the interior structure, as a function of load support or stationary support. Structural supports for the exterior ellipsoid or internal torus, the display screen, rear screens (if applicable), speakers, lighting, A/C, heat, ducting, rigging and more may include various internal framing components, framing support and/or external superstructural components.

In some embodiments, the external enclosure may include external display features. For example, a complete or partial projection surface, display screens, LEDs or other visual components may adhere or be attached to portions, or the entirety, of the external surface of the enclosure. As another example, display elements may be affixed onto or into the exterior surface of the enclosure or cast/projected upon by non-attached projection devices and/or lights. In one such implementation, LEDs may be embedded inside, adhered onto, or attached on a majority of the external surface of the enclosure, allowing for large-scale displays over the outside surface of the venue. As another example, visual content may be front (or rear) projected onto the exterior surface with no physical attachments whatsoever. As another example, the external enclosure may be transparent or translucent in nature with LEDs embedded into (or behind) the actual enclosure surface in select areas or throughout for large-scale displays within or behind a transparent surface of the venue, and another embodiment may be the compositing of two images, one produced either by lining or backing a transparent external structure with projection film, or LEDs, and also projecting upon the back of the internal structure or torus, such that that projection may be seen from the outside through the external structure—thereby compositing two images (in the case of LEDs, they would be mounted to a "transparent" panel, that allowed one to see what was behind it—in this case, imagery projected on the back of the torus).

The material of the enclosure may need to resist any environmental conditions both known (e.g., rain, snow, wildlife, heat, UV rays, etc.) and unforeseen (e.g. tornados, hurricanes, earthquakes). If the external enclosure or dome includes any type of display elements, such as LEDs, the final material may be selected for its optimal optical qualities as well as protection from the elements. For example, a transparent exterior material such as glass, ETFE, plastic, or other may be chosen, along with a UV coating, to protect the display elements without blocking the display or interfering with the transparent nature of the structure. In other embodiments, transparent material may be used to cover larger portions of the enclosure or the enclosure in its entirety, allowing inside features of the venue to be visible from the outside. For example, large transparent sections of enclosure 102 may allow passersby to see the exterior of the torus-shaped interior structure 104 (which we may also front project upon). If the toroidal structure is transparent (i.e., front projection film backed ETFE) in a one-screen scenario, images or video on the torus-shaped interior structure 104, may provide entertainment to viewers both inside and outside of theater area 106 simultaneously. Additionally or alternatively, the torus-shaped interior structure 104 may be partially transparent as well, allowing outside spectators to view some of the entertainment provided within the venue, albeit partially or fully obstructed depending on the vantage point of the spectators. Complete or partial performances inside the theatre area 106 may also be simultaneously displayed on enclosure 102 or other external surfaces.

Various embodiments of the exterior's visual exhibition system maybe LED's on transparent panels inside or behind glass or ETFE (or other plastic) which are graded in pitch, so as to become spaced further apart as the cover higher areas of the exterior; front and/or rear projection on glass or ETFE (or similar) backed with a semi opaque projection film; opaque versions of either; or a clear exterior which can be illuminated by lighting. The semi-opaque and clear versions of the foregoing can afford the viewer on the outside the opportunity to see through them to view events and images on the interior. In certain cases (such as images being projected on the back of the torus), such a combination would create a composite image viewable from the outside (i.e., a front projected moving image on the torus composited with an image produced by LEDs on transparent panels mounted to the interior of the ellipsoid). In an alternate method of compositing an image, an LED covered interior back of torus could be viewed through a clear (glass/ETFE), projection film backed external skin.

II. Audience Area

An audience area may be provided inside any of the theater areas. As shown in FIG. 1, the audience area may include a standing room area (SRO) 108A and various seating areas 108B for audience members of both General Audience (GA) or (VIP) areas. The audience area may also include open spaces or non-obstructed spaces to be used interchangeably in accordance with particular entertainment events.

In an exemplary embodiment, the audience seating 108B may face outward from a central area of the theater. In some embodiments, each seat may be oriented in a direction facing away from a central point. In other embodiments, rows of seats may face substantially outward although each individual seat may not face directly outward. In still other embodiments, seat direction may be changeable, movable or interchangeable, or entire sections may be changeable, movable, or interchangeable. For example, seats may be able to rotate, or have some degree of motion (a third sensory element—movement).

III. Video Processing

In order to display an image internally onto the torus-shaped interior structure 104 and externally onto a dome screen 102, various specialized pieces of equipment and/or processing techniques may be helpful or required. For example, to display images that were originally intended for flat surfaces, may require a new process for the images to display on a toroidal screen, in a 360° or continuous format, or additionally, the projected or processed images may be captured when reflected off the mirrored torus shape, or may be captured by specially ground lenses, 3D lenses, 360° lenses, such that there is no visual distortion when exhibited on a torus, or ellipsoid shaped screens, with no breaks or gaps in the continuous image, and/or non-repeating images to break the flow of the image visual translation to the audience. Additionally, the IDS may display images that substantially cover a full range of vision from a capture location. In order to capture images for such a screen, it may help to use specialized lenses or arrays of cameras.

In an example embodiment, a toroidal screen may be used to display images with a horizontal field of view (FOV) of 360° and a vertical FOV above 200°. In some embodiments, a display may present individual videos or images over a smaller portion of the screen, avoiding the need for capturing large FOV images. In other embodiments, several image capture devices (e.g., cameras, video cameras, photodiodes, etc.) may each capture a portion of the full FOV image. Then, the images captured by each device may be combined into a full FOV image/video. Additionally or alternatively, lenses, fibers, waveguides, and reflectors may be used to direct the light that defines a full FOV image into an image capture device. For example, a curved lens can refract light towards the image-capturing device. As another example, a curved reflector may reflect light towards the image-capture mechanism. As still another example, an array of optical fibers may be used to guide the light into the image-capturing device.

In order to present images on a curved surface, like torus-shaped interior structure 104, the images may be processed to map flat-surface coordinates to curved-surface coordinates so that the images do not appear stretched or distorted. As one implementation, the image may be represented by a set of points in a particular coordinate system. The coordinate system employed may depend on the system used to capture the image. For example, if a set of cameras each captures a flat-surface representation of the view in one direction, the image points may fit most naturally into a Cartesian coordinate system. To fit such an image into the coordinate system, each image is associated with a capture direction and is assigned a certain apparent depth in the viewing direction. In an array of image-capture devices, the capture direction of one device may be implied from the orientation of that device with respect to the other devices. When a curved or other shaped lens is used, the image direction may be determined from geometric light-ray calculations on the lens shape. Once the three-dimensional image coordinates have been determined, a three-dimensional grid of points representing the image-projection surface (e.g., a toroid, etc.) is mapped to the image coordinates to determine the relationship between each capture-image point and each display-image point. For example, if a display-image point falls directly on a capture-image point, then the color associated with that capture-image point becomes the color of the corresponding display-image point. If a display-image point falls between four capture-image points, the color of the display-image point may be an average of the colors associated with the capture-image points. Once the relationship between each display-image point and the corresponding capture-image point(s) is determined, the system may use the relationships to quickly produce a display image defined by the display-image points, rather than mapping each new set of images to the projection surface. Other techniques are possible.

To display video that is captured at the venue (e.g., video of live performers during the live performance), the quick processing techniques may ensure that the videos are processed fast enough to present the images in real time in 2D and/or 3D imagery. Additionally, in order to capture images at the theater, cameras may be placed in specific areas around the theater, inside and out. In some cases, multiple cameras may be attached to rotating supports that move in sync with the moving performance stage to maintain a video feed from the performers.

IV. Audio Systems

Each of the embodiments of visual exhibition system (IDS) described above in 0033 has an acoustical counterpart to accompany it: i) in the case of the front projection upon an opaque screen (perforated aluminum, foam, fabric, etc), both speakers a sound absorptive material (such as fiberglass) could be placed behind a perforated aluminum screen which is mostly transparent to sound. The speakers would propagate the audio while the fiberglass would deaden the otherwise acoustically live space, and control reflected sound. If foam or fabric was the medium used for the screen, that medium itself would deaden reflected vibrations by absorbing the same, while the foam or fabric could be made thinner directly in front of the speaker drivers, allowing the primary intended audio to pass freely through and out to the audience. Additional acoustical management solutions may include positioning speakers upstage and angling them up and away from the audience, into the torus shape, turning the torus itself into an audio propagation device (a giant speaker cabinet). The systems above could work in conjunction with an in-seat audio system, described in patent app "360 Squared Sound," which is incorporated herein by reference.

Audio systems may be provided in an exemplary theater area. Audio input devices may be provided to support sounds associated with live performances. For example, musical acts may use input devices to capture voice and instrument sounds. As another example, stage acts may use microphones to capture on-stage voices and sound effects. Audio output devices may output these captured sounds and other audio associated with live performances or video displays.

Audio output devices, such as speakers, may be provided in any of various locations inside or outside of the theater area, and speakers may be existing or new technologies, or a mix of both for this specific venue. For example, speakers may be provided on or around the stage area, around the secondary display screens, and/or under and around the audience area. Moreover, in some cases, individual speaker systems may be provided within the audience seating area (e.g., chair-mounted speakers). In some embodiments, speakers may be provided behind or within the theater screen.

In order to provide a stable, coherent image on the theater screens, and optimal audio quality, several solutions for sound dampening elements may cover up and/or protect parts of the screen that are more susceptible to audio acoustic vibrations, reflections or reverberation. For example, a screen material that is practically transparent to sound (like perforated aluminum) may have both speakers and sound deadening material placed behind it, thereby preventing the sound systems from impairing the audience's view of the screen).

In a compositing screen implementation with a front-projection screen surface (such as a perforated surface) and a back LED screen surface, speakers may be placed behind the back LED surface. In another implementation, LEDs may cover the speaker grills to create a seamless visual experience with sound deadening properties.

In another audio solution, an active noise cancelation system may be employed. In this example, a transparent Mylar, plastic, or other material would cover all or part of the inside facing surface of the front screen, and would be wired to act as speakers and microphones. In such an implementation, small sections, interspersed across the screen area, may be wired to act as microphones. Additionally, other adjacent sections may be interspersed adjacent to the microphone areas and may be wired to act as speakers. The speakers may cancel sound detected by the microphones by, for example, producing an out-of-phase acoustic wave of the sound detected by the adjacent microphone section. Further, additional sections of the covering may be wired to act as speakers that would transmit audio intended to be heard by the audience (i.e., music, dialogue, sound effects, etc.). In this way, the torus itself (as a structure) acts as both a speaker system and an acoustical deadening solution.

In another embodiment, soundproofing and speakers may be placed behind the LED surface, which may be essentially transparent to sound and covered in LEDs. Spaces between the LEDs may also make the LED panels at least partially transparent to audio, allowing the speakers to present audio to the audience through the led screen. As another example, a vacuum established between the front screen and the back screen may prevent sound waves from propagating to the back screen and exposing reflective audio waves to the audience.

In still another example, the screen may be made "transparent" to sound via gaps in the screen through which sound waves flow without disturbing the screen and without creating reflections. Aside from the gaps, sound-absorbing material or active cancelation systems may cover the back of the screen. In this way, the screen shield may deaden the sound while also allowing sound to pass through the gaps in the surface.

Compositing Screen Design

FIG. 1 shows a toroidal screen as an example theater screen. Different embodiments may include other types, layers, geometries, and numbers of screens. Since the torus-shaped interior structure 104 wraps around the audience in a way that immerses the viewers in a display space, this type of screen may be considered an Immersive Display Screen (IDS). In other implementations, the screen could be various other shapes, including spherical, hemispherical, rectangular, cubic, pyramid shaped, conical, prismatic, and cylindrical, among others. Additionally or alternatively, some embodiments may use non-immersive theater display screens. Although torus-shaped interior structure 104 is shown as a single continuous screen with no gaps, example screens may include multiple screen pieces arranged to function as a single display screen. In some arrangements, the screen may include non-screen areas within the screen surface, while still being considered a single screen, meaning some of the screen may display content where other areas of the screen may not. For example, torus-shaped interior structure 104 may have supporting structures rather than active display areas behind it, as a secondary screen 114A, and still be considered substantially continuous.

Figure 2:
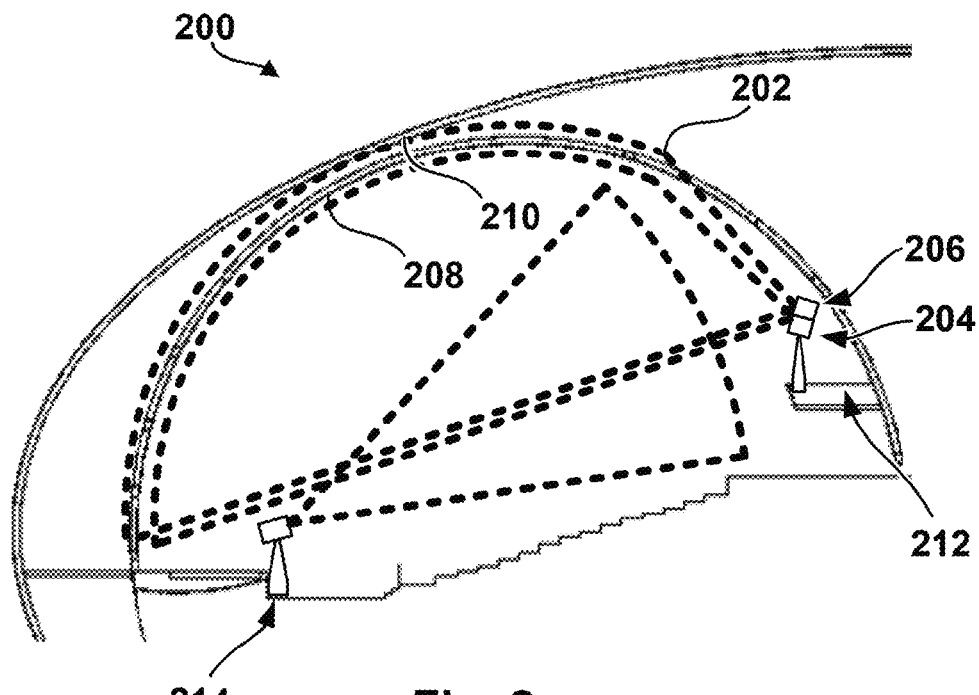
FIG. 2 illustrates an example dual front-projection arrangement for a theater area.

The torus-shaped interior structure 104 may present or display images and video in a number of different ways and explorations. For example, one or more projection devices may project images onto, or from, torus-shaped interior structure 104. Such projectors may be placed inside the theater area 106 to project images onto the inside of torus-shaped interior structure 104 (i.e. front projection). In other embodiments, projectors may be placed around the outside of the theater area to illuminate visible internal portions of the screen by projecting images onto the backside of the screen (i.e., rear projection). In other embodiments, projectors may be placed behind the torus-shaped interior structure 104, shining through but remaining hidden to the audience FIG. 2 shows an example projector arrangement 200 for a dual front-projection implementation. A front-projection arrangement may involve a great many projectors spread around the theater area 106 and/or behind it (e.g. inside a crow's nest). In particular, arrangement 200 includes projector 204, projecting on a portion (labeled with arc 208) of screen 202, projector 206, projecting on another portion (labeled with arc 210) of screen 202, and projector 214, projecting on a third portion (labeled with arc 216) of screen 202. In some cases, the multiple projectors may project onto different areas of the front and back screens. In other cases, like arrangement 200, the projection areas may overlap or projectors may be stacked on one another. In still other cases, multiple projectors may illuminate substantially the same areas of the screens to increase brightness, luminosity and image resolution.

Figure 3:
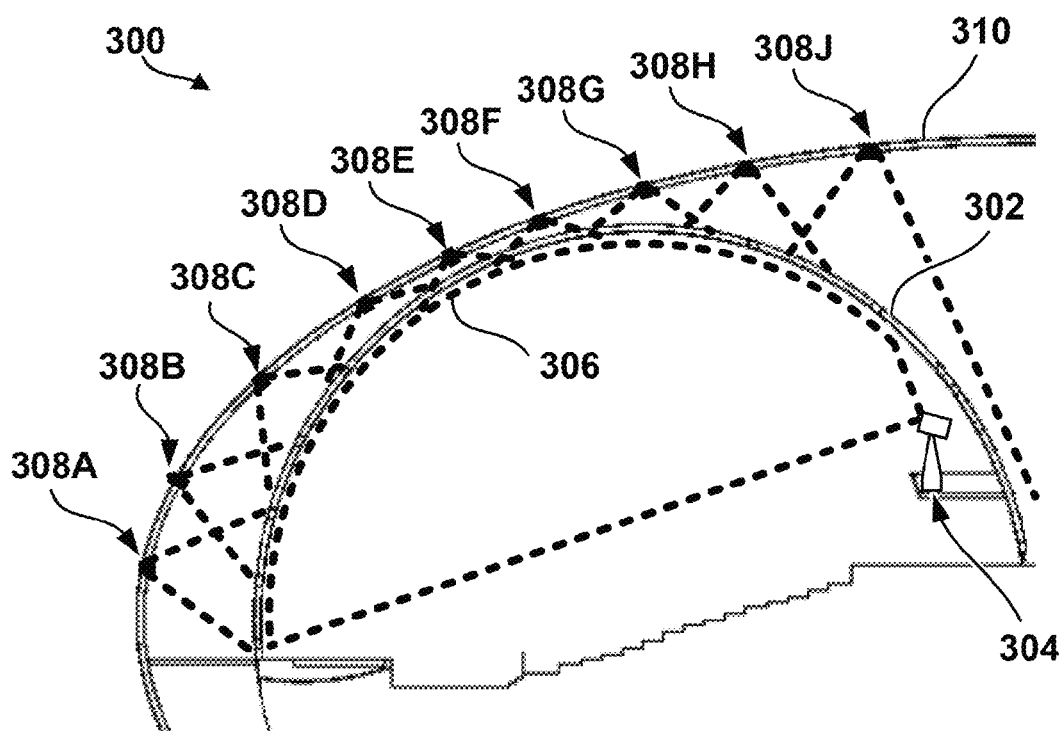
FIG. 3 illustrates an example front- and rear-projection arrangement for a theater area

FIG. 3 shows a combination front and rear projection arrangement 300 that includes a front projector 304 to project the front image onto a portion of the front screen (labeled as arc 306) of compositing screen 302. Additionally, arrangement 300 includes nine rear projectors 308A-308J arranged along the internal side of exterior enclosure 310. Each rear projector displays a portion of the back image on a part of the back screen of compositing screen 302, including several overlapping areas. In some similar arrangements, rear projectors (or stacked/parallel sets of projectors) that may be configured to display onto individual areas of the screen, without overlapping.

In any projection system, light-guiding elements may be employed to direct projected light onto one or more display screens or surfaces. For example, an example screen may direct light from projectors to display screens using optical elements such as waveguides, reflective surfaces, lenses, optical fibers, electro-optical deflectors, acousto-optical deflectors and/or beam-splitters, among other elements and devices. As a particular implementation, laser light from one central source may be divided up to shine or reflect on individual portions of the backside of a theater screen.

In addition to light-projection systems, various other visual display devices may produce images on torus-shaped interior structure 104. For example, multiple light sources may be embedded into, in front of, and/or behind the screen to forma a multiple image display. Any of various light source types may be used in such an arrangement. For instance, light emitting diodes (LEDs), other electroluminescent components, incandescent light sources, gas discharge sources, lasers, electron emission sources, and/or quantum dot sources may be used to realize the display, among other examples. In particular, low pixel pitch LED arrays may be embedded over the screen surface of a theater screen, so that no projection systems would be necessary. In another implementation, torus-shaped interior structure 104 may be optically responsive to electron bombardment (e.g., a fluorescent screen). In such an implementation, a cathode-ray source may activate portions of the screen to produce images.

Figure 4:
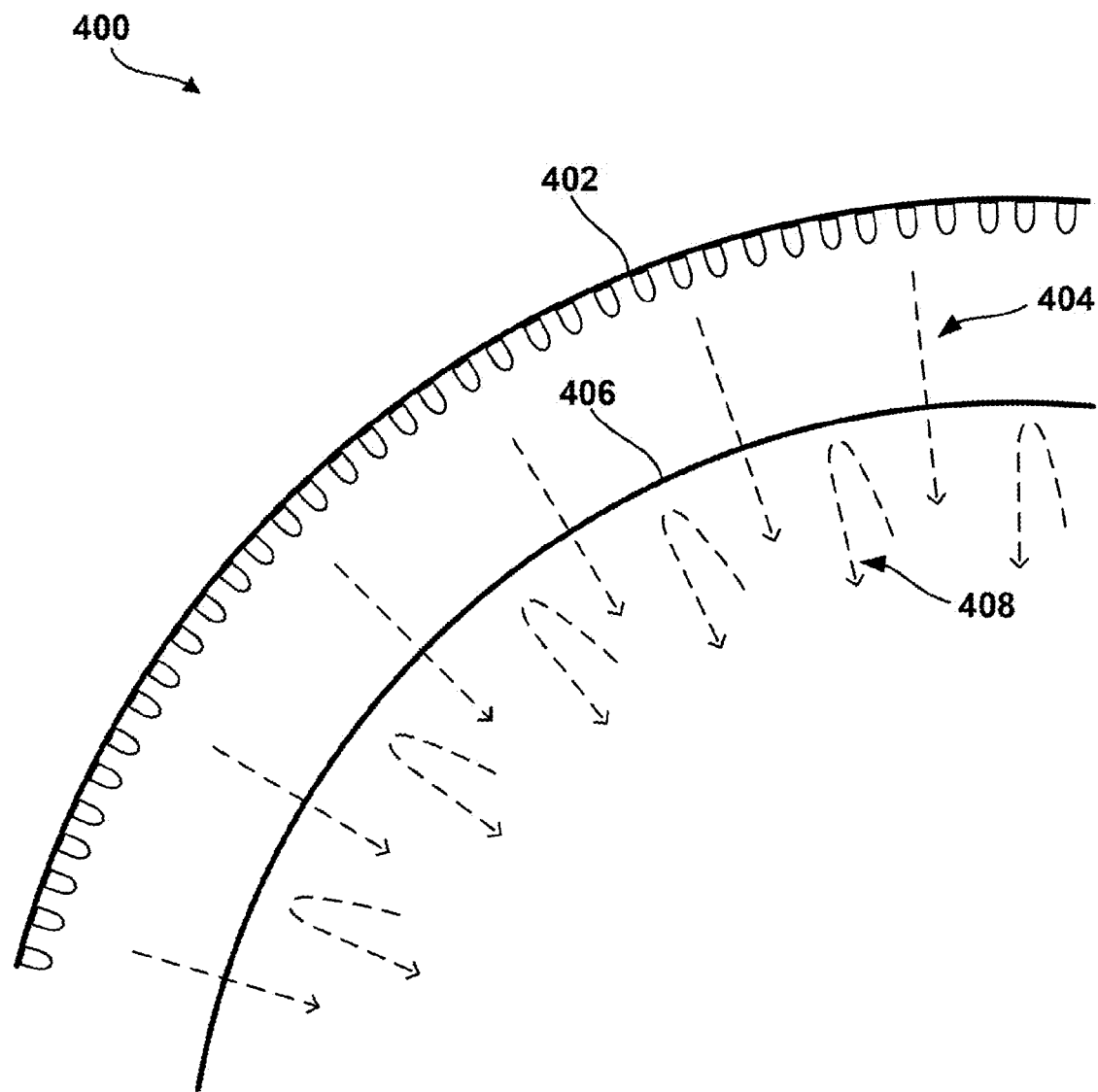
FIG. 4 illustrates an example compositing screen.

A compositing display screen is designed to provide multiple images at once. FIG. 4 shows an expanded view of an example compositing screen that includes an LED back screen 402 behind a projection-based front screen 406. For example, the front screen may be a material or structure that is semipermeable to light emanating from behind it, but also sufficiently reflective of light projected onto its front by a laser projector, allowing such a projector to superimpose an image over the LED back screen. In this way, a 3D three-dimensional image or a "composite" and/or parallax image may be produced by the physical separation between both projected images. In FIG. 4, light rays representing the back image are shown as straight dotted lines (e.g., line 404) while light rays representing the front image are shown by reflecting dotted lines (e.g., line 408). As one example implementation, the distance between the front and back screens may be correlated to the depth of the performance stage in the theater, so that displayed images of performers on the stage may convey the distance between the performers and the background. As another example, the distance between the front and back screens may be uniform to maintain the same level of brightness and luminosity and 3D or parallax effect throughout the structure. In certain cases, the background behind the performers may be displayed as the back image, while images of the performers may be displayed as the front image simultaneously or at separate times. Examples of semipermeable screen structures are a perforated aluminum screen (with a sufficiently high void percentage, and sufficiently high reflective coating) vinyl, Teflon, plastic or other, and/or clear ETFE backed with a partially transparent front projection film and with a clear layer of sound absorbent film adheased to its front.

Figure 5:
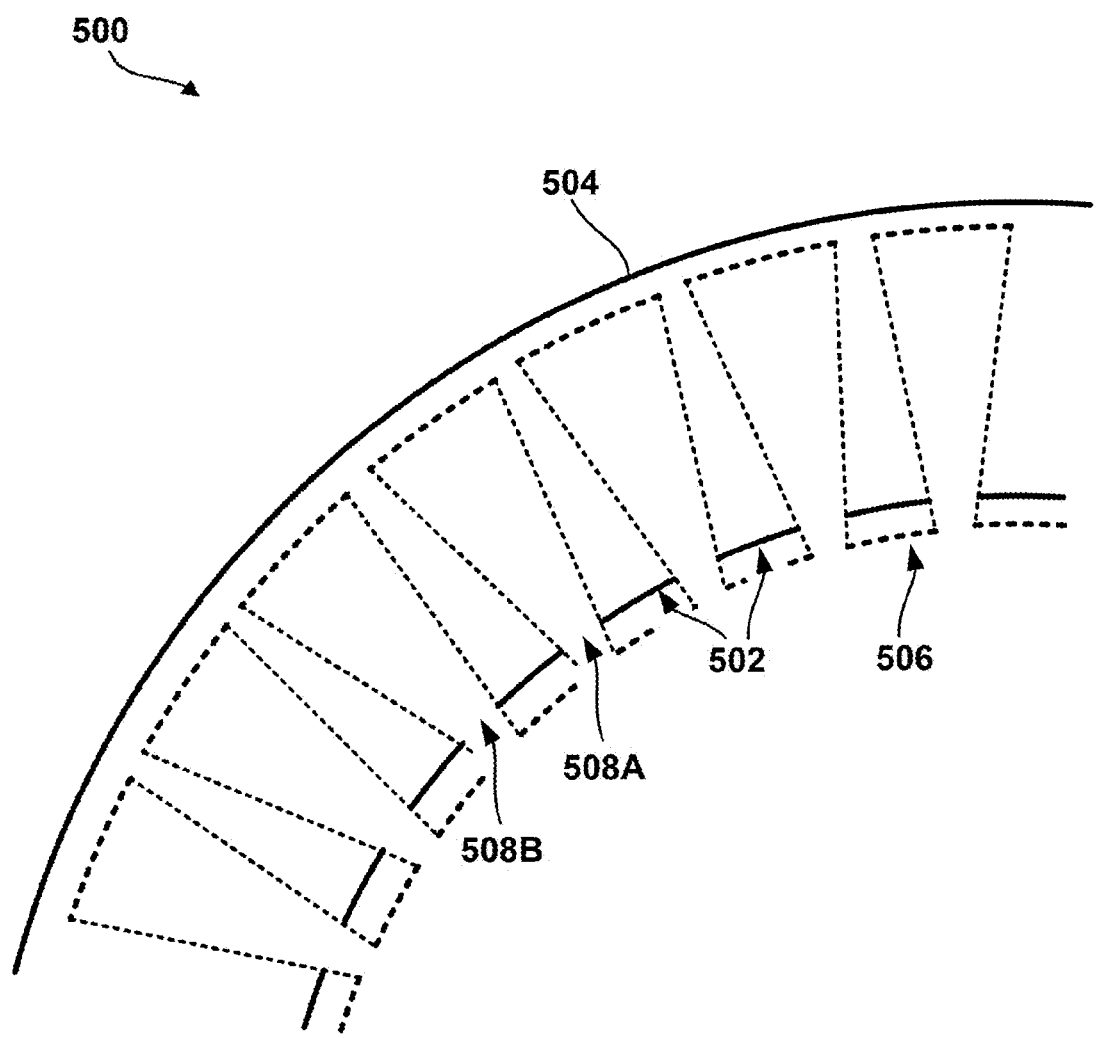
FIG. 5 illustrates an example compositing screen.

FIG. 5 shows an expanded view of another example compositing-screen system 500 that may be utilized in a projection display system. The screen system includes a non-continuous front (perforated screen 502) in front of a continuous, equidistant rear screen 504 creating composite images for an audience. As shown, some of the light (shown as path 506) that is projected onto screen system 500 impinges on front screen 502, resulting in a front image, while the light that passes through open sections (for example, 508A and 508B) of front screen 502 impinges on back screen 504, producing a back image and a 3D parallax effect for the audience in both standing 108A and seating 108B areas. In some embodiments, front screen 502 may be transmissive to certain light types, rather than having physical gaps or a percentage of perforation in the screen. For example, front screen 502 may be opaque to s-polarized light and transparent to p-polarized light. By projecting light that is a superposition of s-polarized and p-polarized light, the front and back images may then form from the s-polarized and p-polarized light, respectively. Alternatively, two projectors may be used such that one projector illuminates the front screen and one illuminates the back screen. In an implementation that uses openings in screen 502, the size and spacing of the openings in the front screen may be chosen such that the front and back images are both visible to viewers. Other combinations are also possible.

Figure 6:
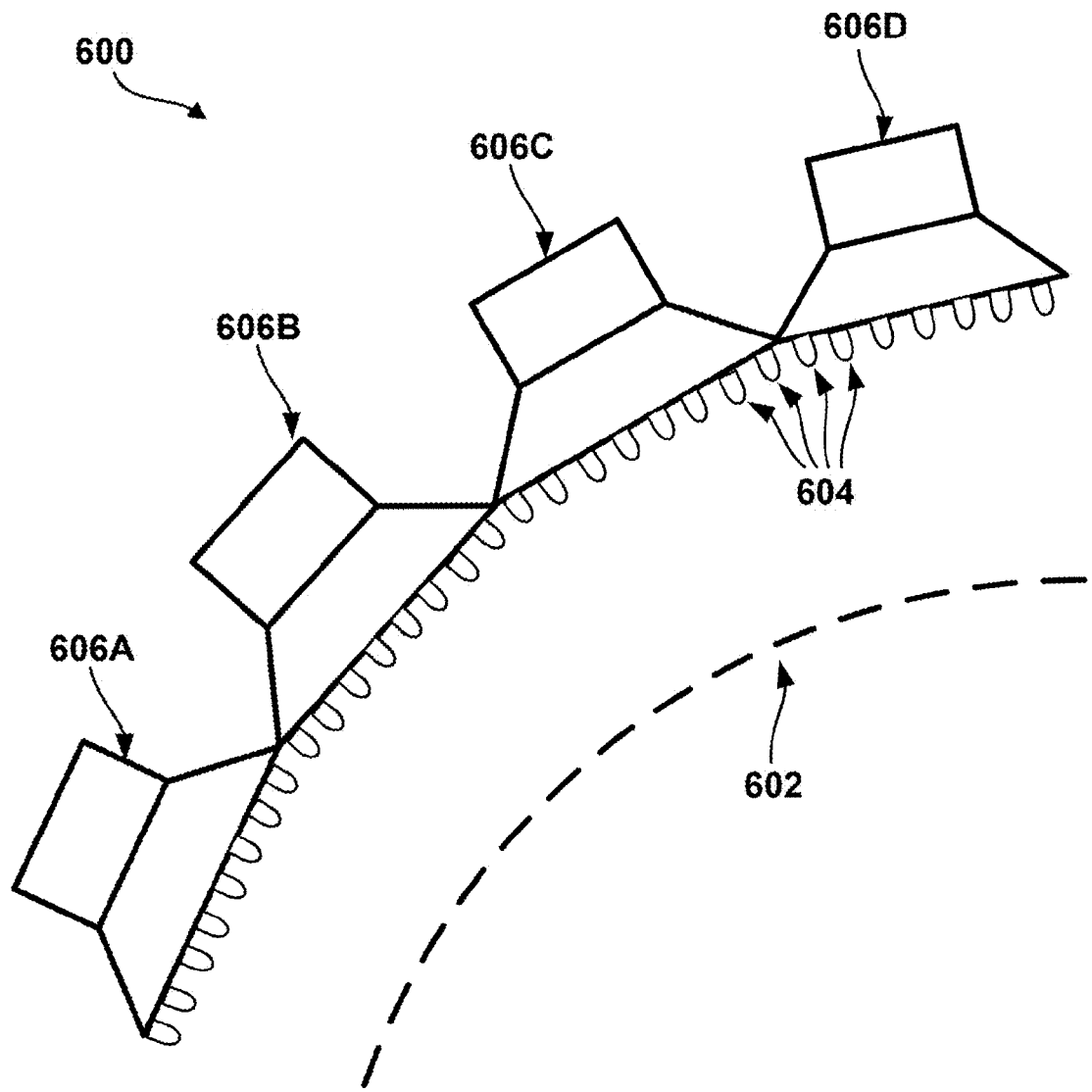
FIG. 6 illustrates an example compositing screen.

FIG. 6 shows elements of an additional compositing screen implementation 600. In implementation 600, a perforated or otherwise transparent front screen 602 is place in front of a back screen that includes LED sources 604 on the front speakers 606A-D. In such an arrangement, the material and/or design of front screen 602 may be chosen such that it is substantially transparent to sound from speakers 606A-D.

Figure 7:
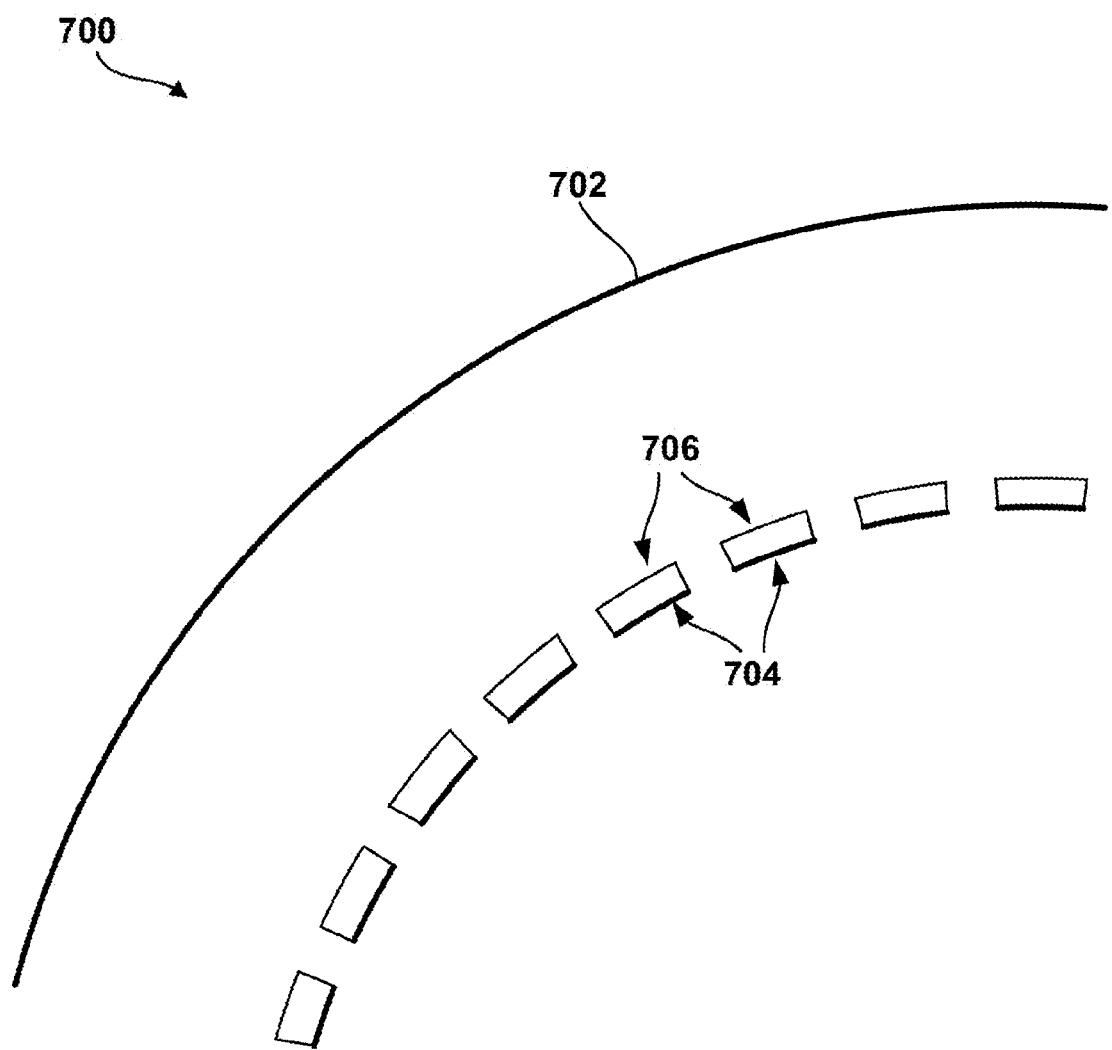
FIG. 7 illustrates an example compositing screen.

FIG. 7 shows another arrangement 700 of elements in a compositing screen. As shown, arrangement 700 includes a back screen 702 of any variety and a front screen 704 that is perforated. Also as shown, soundproofing material or structures 706 is attached behind front screen 704. Either this material may be perforated (as shown) along with the front screen, or it may be transparent to the light from back screen 702. In some cases, front screen 704 may be implemented as entirely soundproofing material, such that relatively few acoustic reflections occur off screen 704.

The torus-shaped interior structure 104 may also present 3D images. For example, a 3D-glasses or non-glasses autostereoscopic display (ASD) system may be used to polarize or colorize images to create 3D images via left and right visual responses or visual color cone responses to replicate 3D visualization with or without the use of glasses. As another example, torus-shaped interior structure 104 may include a lenticular array, parallax barrier, holographic, or other autostereoscopic 3D system so that viewers can view 3D images without polarizing or colorizing the images.

Other examples of display systems for both the front and rear screens may include: Front or rear projection, LEDs, OLEDs, laser projection, ASD (auto-stereoscopic display) LEDs, ASD front projection, holography, 3D "ghosting" or full 3D effect (e.g. Pepper's Ghost or Steinmeyer illusion).

Compositing Screen Uses

Figure 8:
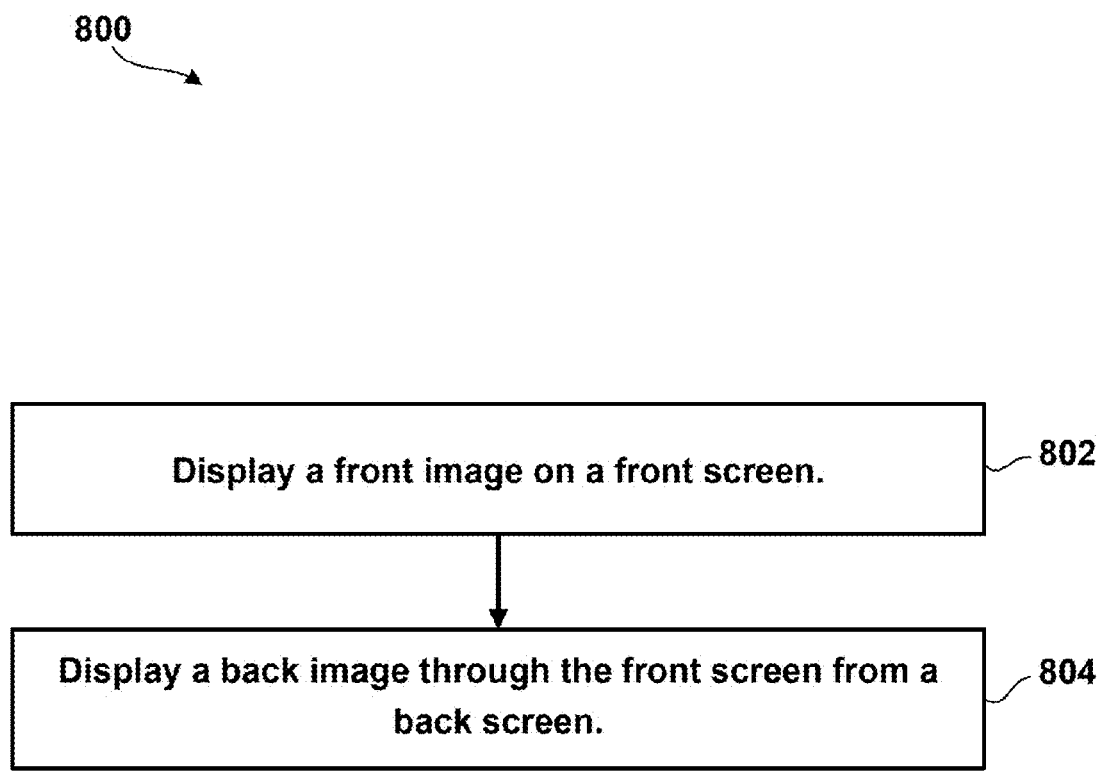
FIG. 8 illustrates steps of an example process.

FIG. 8 illustrates a method 800 according to an exemplary embodiment. As shown, method 800 involves displaying a front image on a front screen (block 802). Method 800 also includes displaying a back image through the front screen and on a back screen (block 804). In an example, these stops may be performed simultaneously to produce a composite of images.

Figure 9:
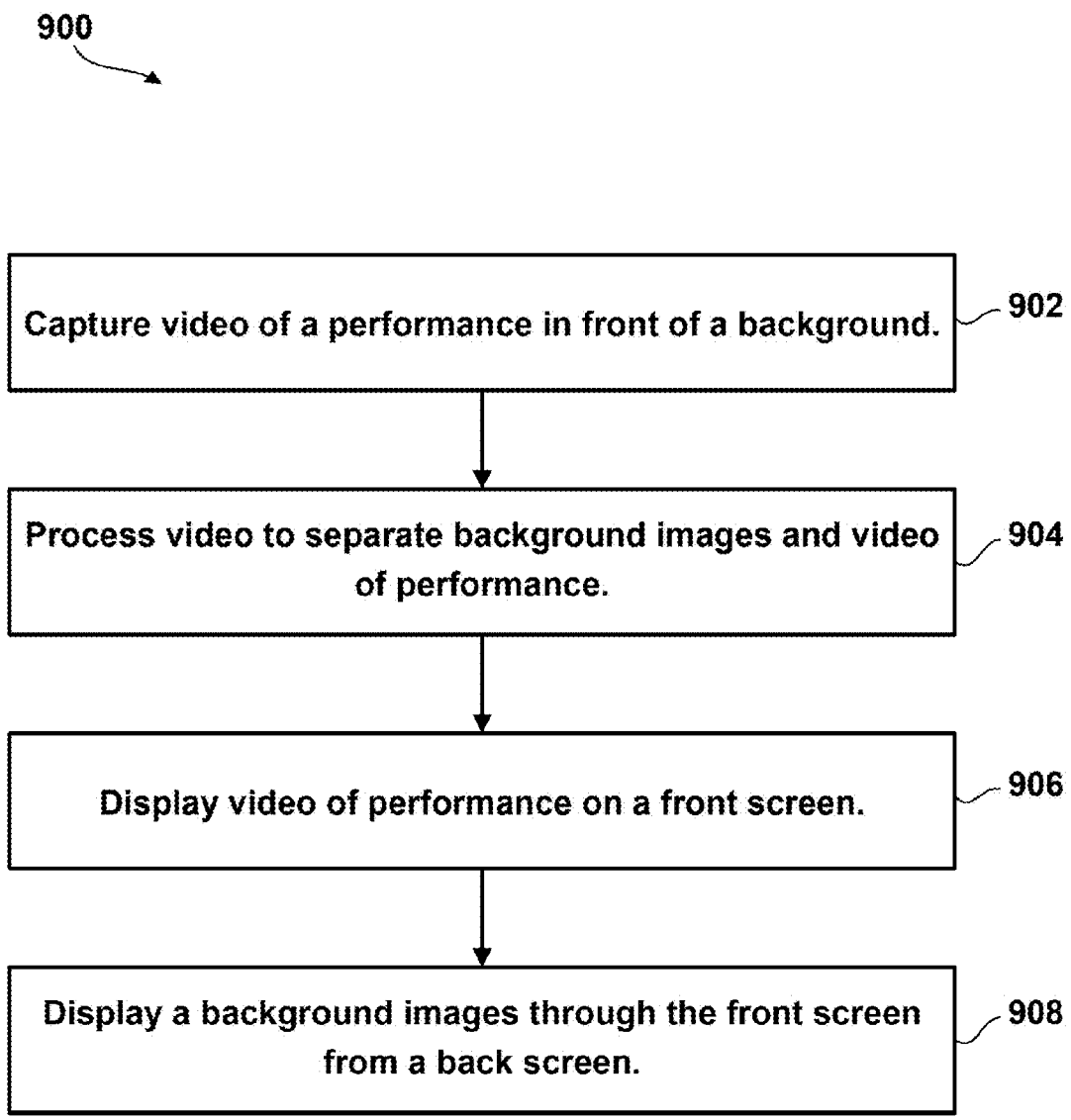
FIG. 9 illustrates steps of an example process.

FIG. 9 illustrates another example method 900. Method 900 involves capturing video of a performance in front of a background (block 902). Method 900 also involves separating the background image from the video of the performance (block 904). Further, method 900 involves displaying the video of the performance on a front screen (block 906). Additionally, method 900 involves displaying the background on a back screen (block 908).

CONCLUSION

The construction and arrangement of the elements of the video and audio systems and methods as shown in the exemplary embodiments are illustrative only. Although only a few embodiments of the present disclosure have been described in detail, those skilled in the art who review this disclosure will readily appreciate that many modifications or alterations are possible over the course of each construction (e.g., variations in sizes, dimensions, structures, shapes and proportions of the various elements, values of parameters, mounting arrangements, use of materials, colors, orientations, etc.) especially when components are built to specifications, without materially departing from the novel teachings and advantages of the subject matter recited. For example, elements shown as integrally formed may be constructed of multiple parts or elements, with slight or major modifications but not modifications in overall principals or strategies. The elements and assemblies may be constructed from any of a wide variety of materials that provide sufficient strength or durability. Additionally, in the subject description, the word "exemplary" is used to mean serving as an example, instance or illustration. Any embodiment or design described herein as "exemplary" is not necessarily to be construed as preferred or advantageous over other embodiments or designs. Rather, use of the word exemplary is intended to present concepts in a concrete manner. Accordingly, all such modifications are intended to be included within the scope of the present disclosure. The order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes, and omissions may be made in the overall design, operating conditions, and arrangement of the preferred and other exemplary embodiments without departing from the actual scope (or baseline ideas, thoughts, principals, etc.) of the present disclosure or from the scope of the appended claims.

Although the figures show a specific order of method steps, the order of the steps may differ from what is depicted, especially in the construction process of the various elements within. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. An display screen comprising:
  a back screen operable to display a back image to an audience area;
  a front screen positioned substantially in front of the back screen, facing the audience area, wherein the front screen is at least partially transparent to light from the back screen, wherein the front screen is operable to display a front image, separate from the back image; and
  soundproofing material on a back of the front screen, wherein the soundproofing material is sufficiently transparent to light from the back screen.

2. The display screen of claim 1, further comprising a projection system configured to present the front image by front projection onto the front screen.

3. The display screen of claim 1, wherein the display screen is an immersive display screen.

4. The display screen of claim 1, wherein each of the front screen and the back screen cover substantially the entire area of the immersive display screen.

5. The display screen of claim 1, wherein the back screen and the front screen have a toroidal shape, and wherein the audience area faces outwardly towards the back and front screens.

6. The display screen of claim 1, wherein the back screen comprises light emitting diodes (LEDs), and wherein the back image is displayed by the LEDs.

7. The display screen of claim 6, wherein a portion of the LEDs are positioned on gratings of theater speakers, and wherein the front screen is sufficiently transparent to sound from the theater speakers.

8. The display screen of claim 1, further comprising a rear projection system, wherein the back screen uses rear projection from the rear projection system to display the back image.

9. The display screen of claim 1, wherein the front screen comprises a perforated aluminum screen.

10. The display screen of claim 2, wherein the projection system comprises a laser projection system.

11. The display screen of claim 1, wherein the back screen is further configured to simultaneously provide the back image to an external rear surface of the back screen.

12. A method comprising:
  displaying a front image on a front theater screen, wherein the front theater screen has a curved geometry;
  displaying a back image on a back theater screen positioned substantially behind the front theater screen with respect to an audience area, wherein the back image is displayed through the front theater screen towards the audience area; and
  using array processing on a precalculated model of the curved geometry to adjust data representing the front image prior to delivering the adjusted data to display components associated with the front theater screen.

13. The method of claim 12, wherein the front and back theater screens define an immersive display screen.

14. The method of claim 12, wherein displaying the front image on the front theater screen comprises projecting the front image onto the front theater screen using front projection, and wherein displaying the back image on the back theater screen comprises projecting the back image, through the front theater screen, onto the back theater screen using front projection.

15. The method of claim 12, wherein back theater screen comprises light-emitting diodes (LEDs), and wherein displaying the back image comprises using the LEDs to display the back image through the front screen.

16. The method of claim 12, wherein displaying the back image comprises projecting the back image onto the back screen from a rear projection system.

17. The method of claim 12, further comprising displaying the back image to both a front side of the back screen and a back side of back screen such that the back image may be seen from both in front of and behind the back screen.

18. The method of claim 12, wherein the precalculated model adjusts for curvature of viewing and light reflectivity.

* * * * *